United States Patent
Long (10) Patent No.: US 8,413,891 B2
(45) Date of Patent: Apr. 9, 2013

(54) SYSTEM AND METHOD FOR FACILITATING BANKING TRANSACTIONS

(75) Inventor: James William Long, Merseyside (GB)

(73) Assignee: Talaris Holdings Limited, Basingstoke (GB)

( * ) Notice: Subject to any disclaimer, the term of this patent is extended or adjusted under 35 U.S.C. 154(b) by 0 days.

(21) Appl. No.: 13/151,668

(22) Filed: Jun. 2, 2011

(65) Prior Publication Data

US 2012/0305640 A1 Dec. 6, 2012

(51) Int. Cl.
*G06Q 40/00* (2006.01)
*G07D 11/00* (2006.01)
*G07F 19/00* (2006.01)

(52) U.S. Cl.
USPC .......................................................... 235/379

(58) Field of Classification Search .................. 235/379, 235/381, 383, 462.1, 462.14, 462.45, 375, 235/462.01; 705/39–45
See application file for complete search history.

(56) References Cited

U.S. PATENT DOCUMENTS

| | | | |
|---|---|---|---|
| 7,199,714 B2 * | 4/2007 | Sako et al. ................. | 340/572.1 |
| 7,874,479 B2 | 1/2011 | Drummond et al. | |
| 2004/0122771 A1 * | 6/2004 | Celi et al. ........................ | 705/43 |
| 2005/0167488 A1 * | 8/2005 | Higgins et al. ................ | 235/381 |
| 2007/0235521 A1 * | 10/2007 | Mateen et al. ................ | 235/379 |
| 2007/0246525 A1 * | 10/2007 | Smith et al. .................... | 235/379 |
| 2007/0295805 A1 * | 12/2007 | Ramachandran ............ | 235/379 |
| 2008/0247629 A1 | 10/2008 | Gilder | |
| 2009/0006203 A1 * | 1/2009 | Fordyce et al. ................. | 705/14 |
| 2010/0125509 A1 * | 5/2010 | Kranzley et al. ............... | 705/17 |
| 2010/0205063 A1 * | 8/2010 | Mersky ........................... | 705/17 |
| 2010/0324727 A1 | 12/2010 | Eonnet | |
| 2011/0288999 A1 * | 11/2011 | McGraw et al. ............... | 705/44 |

FOREIGN PATENT DOCUMENTS

| | | |
|---|---|---|
| EP | 2 075 770 A2 | 1/2009 |
| WO | 2009/070114 A1 | 6/2009 |

OTHER PUBLICATIONS

PCT International Search Report dated Sep. 17, 2012 for PCT/IB2012/001051.

* cited by examiner

*Primary Examiner* — Tuyen K Vo
(74) *Attorney, Agent, or Firm* — Boyle Fredrickson S.C.

(57) ABSTRACT

A computer-implemented system and method is used for facilitating a single instance banking transaction. The method includes the steps of receiving a banking transaction request from a banking account holder at a first banking computer system, the request including at least an account identification and transaction information, generating a single instance banking transaction indicia correlated to the banking transaction request, providing the single instance banking transaction indicia to the banking account holder, receiving the single instance banking transaction indicia at a second banking computer system, and performing the banking transaction request at the second banking computer system.

21 Claims, 5 Drawing Sheets

SYSTEM AND METHOD FOR FACILITATING BANKING TRANSACTIONS

FIELD

The present invention relates to systems and methods for implementing banking transactions. Specifically, the present invention relates to a system and method for implementing a banking transaction using a single use transaction indicia.

BACKGROUND

Banking operations have increasingly become automated to allow customers to easily perform transactions. However, even when automated, customers cannot always easily perform the transactions they would like at a time they would like. For example, some customers may prefer to perform banking operations from their home computer systems or when working with bank employees that are not able to perform the banking operations.

For example, an account holder may be speaking with a bank employee about a mortgage application. During that conversation, rather than joining a queue to speak with a bank teller, the account holder may request that the bank employee perform a banking transaction, such as withdrawing currency from their account, either for convenience or because they do not have their bank card with them, for example. Since the bank employee is usually not equipped to dispense currency, this requires the employee to either direct the account holder to a teller queue or to interact with a teller to perform the transaction.

According to another example, account holders frequently use their computer systems to access and manage their banking accounts. However, in performing banking operations that requires the transfer of currency, the account holder is required to travel to the bank to converse with a teller or use a machine to initiate and perform the transaction. In general, performing the transaction consists for a user of inserting a bank card in a slot of the automated transaction machine, and in entering a four-figure secret code associated with this bank card. The user then chooses an amount and receives from the automated transaction machine currency corresponding to the chosen amount. This authentication technique, although very simple, requires that a secret code is memorized and that the user has a bank card with them to withdraw money using the automated transaction machine.

What is desirable is a system and method for facilitating a single banking transaction that avoids the use of a bank card. What is further desirable is such a system and method that provides security regarding the use of account information. What is yet further desirable is such a system and method where the banking transaction is constrained to a specific transaction.

SUMMARY

One exemplary embodiment of the invention relates to a computer-implemented system and method for facilitating a single instance banking transaction. The method includes the steps of receiving a banking transaction request from a banking account holder at a first banking computer system, the request including at least an account identification and transaction information, generating a single instance banking transaction indicia correlated to the banking transaction request, providing the single instance banking transaction indicia to the banking account holder, receiving the single instance banking transaction indicia at a second banking computer system, and performing the banking transaction request at the second banking computer system.

According to another exemplary embodiment of the invention, performing the banking transaction request at the second banking computer system can include voiding the single instance banking transaction indicia.

According to yet another exemplary embodiment of the invention, the single banking transaction indicia is a bar code provided to the banking account holder as a paper slip including the bar code or electronically to a portable electronic device.

The method may be performed by receiving the single instance banking transaction indicia using a portable scanning device at a second banking computer system. The indicia may be received directly using an integral scanner or received wirelessly from an external scanning device.

Other features and advantages of the invention will become apparent to those skilled in the art from the following detailed description and accompanying drawings. It should be understood, however, that the detailed description and specific examples, while indicating the preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

Before explaining embodiments of the invention in detail, it is to be understood that the invention is not limited in its application to the details of construction and the arrangement of the components set forth in the following description and illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

Figure 1:
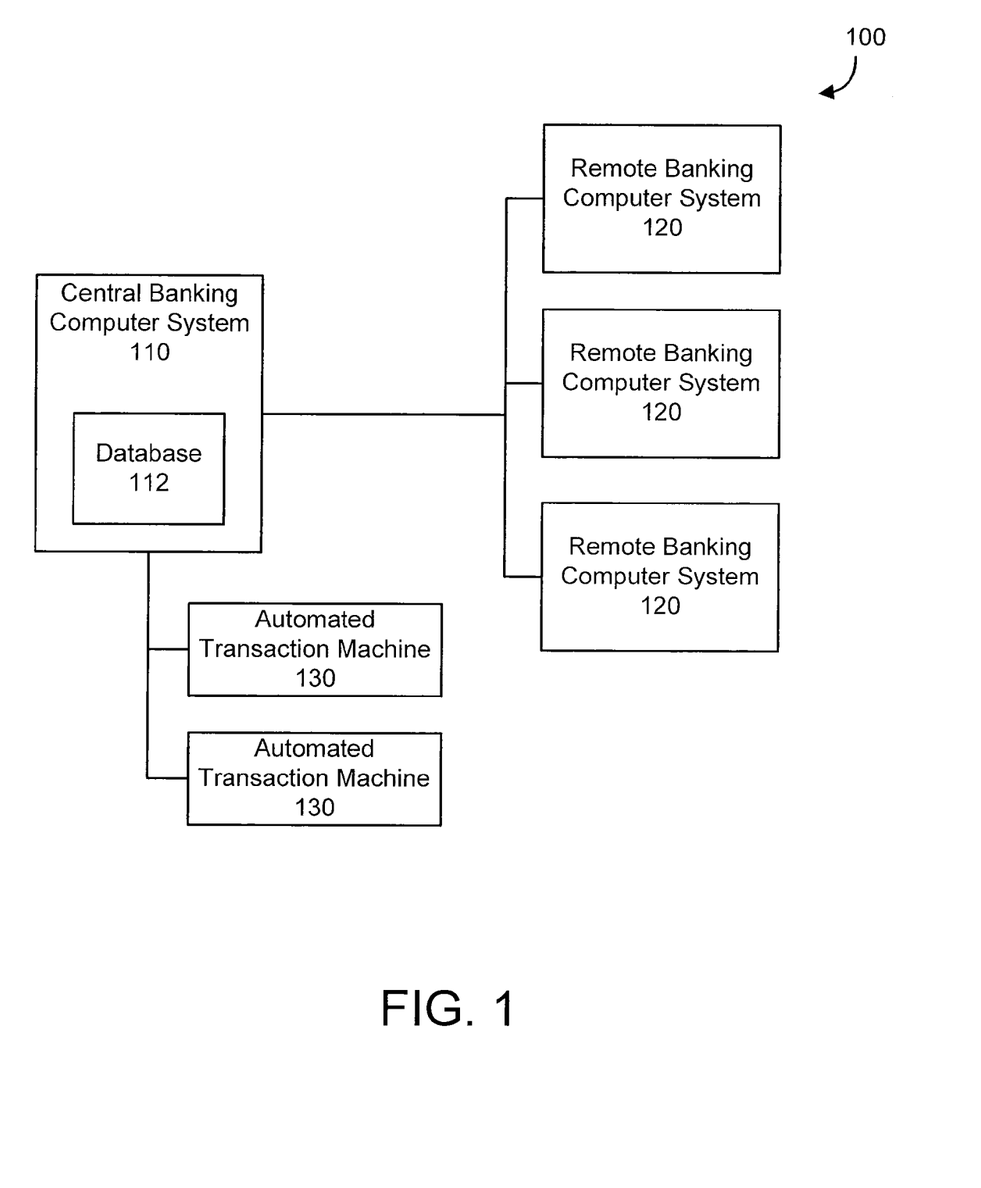
FIG. 1 is a block diagram illustrating a system for facilitating banking transactions using an automated transaction machine, according to an exemplary embodiment.

Referring now to FIG. 1, a system 100 for facilitating banking transactions using an automated transaction machine is shown, according to an exemplary embodiment. System 100 includes a central banking computer system 110, one or more remote banking computer systems 120, and at least one automated transaction machine 130.

Central banking computer system 110 may be a typical bank computer system configured to include a relational database and electronic file system 112 of consumer and business accounts that contain information about every account holder associated with the bank or credit union. In one embodiment, database 112 includes name and address information, a variety of financial accounts such as checking, savings, loans, and investments such as certificate of deposit and investment retirement accounts. Database 112 typically resides on secure computer servers (not shown) with highly redundant components to maintain the integrity of the account holder files. System 110 also provides functions such as administration and management reporting, settlement, statement generation, financial projections, interest calculations, amortization, and overall general ledger functions required to manage the bank and credit union as required by federal regulations.

Utilizing remote banking computer systems 120, account holders, either directly or through a bank employee, create transaction messages that initiate the primary financial services of deposit, withdrawal, account transfer, inquiry, and file maintenance for their accounts residing in database 112. Systems 120 may be configured to communicate with system 110 to perform the transactions and update the corresponding data within database 112.

Remote banking computer systems 120 may be computer systems within the central bank location housing the central banking computer system 110, computer systems within one or more central bank locations, etc. Banking computer systems 120 may further be account holder computing systems, such as the account holder's home or office computing system, using an interface, such as a web browser, to access the central banking computer system 110. Account holder transactions generated at a banking computer systems 120 may be routed by secure communication channels to system 110 to complete core accounting functions.

Within system 100, banking computer systems 120 may be instructed to perform transactions requiring the physical transfer of currency including, for example deposit and withdrawal transactions. However, banking computer systems 120 may not be configured for receiving and dispensing currency and/or associate with users that are tasked with performing that function. One such example includes the account holder in a bank branch talking to a banker about a mortgage, for example, and requesting that the mortgage banker also perform a withdrawal transaction. Another such example may include the account holder using their home computing system to perform a withdrawal operation.

The received transaction request is generally a single transaction or a series of single transactions that may be treated as individual transactions to be performed by system 110 using the information in data store 112 and an automated transaction machine 130. The single use transaction may be recorded and queued within system 110 in a transaction record until performance of the transaction. The transaction record may include an account holder name, an account number, a transaction number, an expiration time/date, a listing of valid collection locations, a time range for performance of the transaction, and/or any other information related to the transaction.

In order to facilitate performance of the transaction, despite being unable to perform the transaction directly, system 120 may be configured such that the account holder is provided with a transaction indicia. The transaction indicia may be configured to include all the details of the transaction, such as the account holder name, the account number, the transaction number, and the expiration time/date, and/or any other information related to the transaction. The transaction indicia may be encrypted using public key encryption and provided to the account holder as, for example, a bar code or coded number to provide security.

The transaction indicia may be provided to the account holder in any of a variety of forms. According to a first embodiment, the transaction may be printed on a piece of paper provided to the account holder. According to an alternative embodiment, the transaction may be provided electronically, such as by transmission to a portable computing device of the account holder having a display allowing the display of the transaction indicia.

Figure 2A:
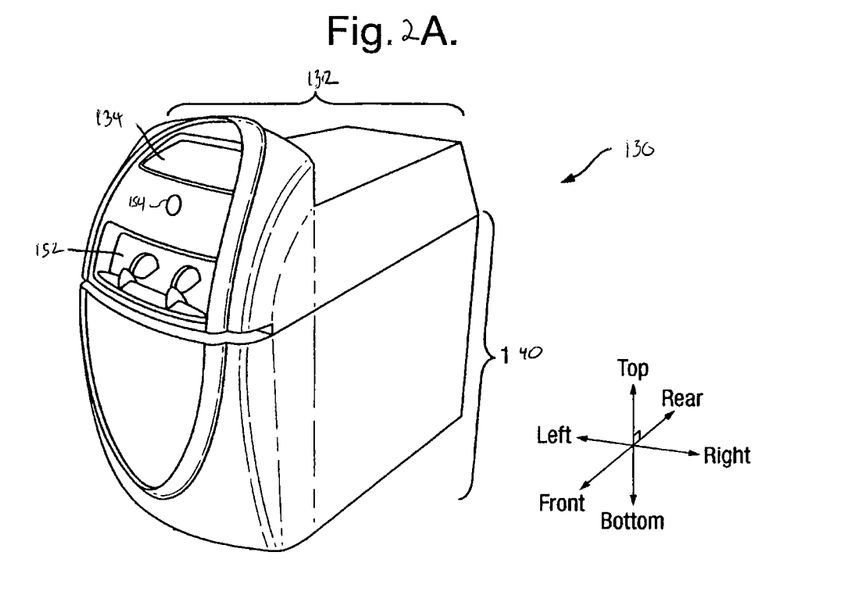
FIGS. 2A and 2B are views of a automated transaction machine showing its constituent modules, according to an exemplary embodiment.
Figure 2B:
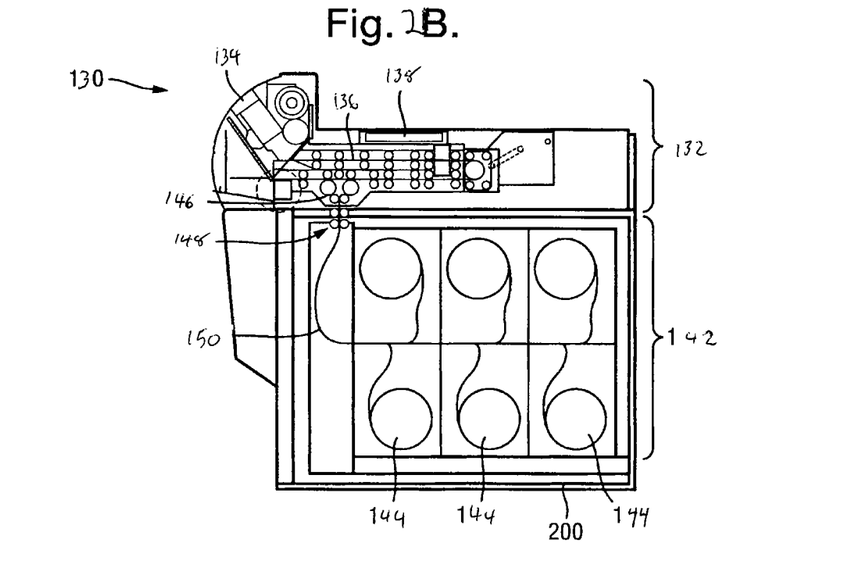

Automated transaction machines 130, described below in further detail with reference to FIG. 2, are configured to perform transactions including the transfer of physical items based on the transaction indicia. Automated transaction machines 130 are typically in communication with, if not directly controlled by, communication with system 110 in performing the transactions. Typical transactions include the deposit and withdrawal of currency available based on the account holder's account. Additional transactions may include dispensing non-currency items, such as postage stamps.

Advantageously, system 100 allows an account holder to conduct a transaction using a teller machine 130 without the benefit of a bank card using the transaction indicia. Further, system 100 allows the transaction indicia to define a transaction that may be pre-defined for a specific amount, for a specific time, etc. to provide additional security. Advantageously, according to one exemplary use, an account holder may initiate a transaction to obtain a transaction indicia as described herein. The account holder may then provide the transaction indicia to a third party to perform the transaction without fear that the transaction amount will be changed, without providing a bank card and security code, etc.

Referring now to FIG. 2, an automated transaction machine 130 is shown, according to an exemplary embodiment. Its primary modes of operation involve receiving a stack of banknotes and storing them in appropriate storage modules, and dispensing banknotes from those storage modules to a user, typically a bank teller. A perspective view of the banknote handling apparatus 130 is shown in FIG. 1A. A schematic cross-section is illustrated in FIG. 1B.

The apparatus 130 comprises a cabinet or safe 140 within which is housed a frame to which a storage assembly 142 is mounted. The storage assembly 142 consists of a number of roll storage modules (RSMs) 144 in which banknotes can be stored. On top of the cabinet 140, a note handling module (NHM) 132 is provided which consists of a number of components which input banknotes to the storage assembly 142 and/or output banknotes from the storage assembly 142 to the user. The note handling module (NHM) 132 comprises an input module 134, from which a stack of banknotes are fed one by one into transport 136 for conveying each banknote past detectors 138 to a diverter 146. If the banknote is to be stored in the storage assembly 142, the diverter 146 directs the banknote into the storage assembly 142 via the through safe transport 148 and the transport safe module 150 to the appropriate RSM 144. If the banknote is to be returned to the user, the diverter 146 directs the banknote to stacker 152 from which it can be collected by the user. When a banknote is to be dispensed from a roll storage module 144, it is conveyed in the reverse direction out of the RSM 144, along the transport safe module 150, via the through safe transport 148 to the diverter 146 which directs the banknote to the stacker 152 where it can be collected by the user. There are a number of machine variants available, each of which is adapted for the specific end application. The description below will largely focus on a standard version, as shown in FIG. 1B. The example shown incorporates six RSMs 144, but other versions may include two, four, eight or more RSMs as desired. The NHM 132 shown incorporates a standard set of detectors 138, but in an enhanced version, one or more additional detectors, such as an ultrasound detector could be included and the NHM transport 136 is extended towards the rear of the machine to accommodate this. The cabinet 140 itself is available in a number of different variants to suit different security requirements and provide one or more manual drop boxes on the front if so desired.

The operation of the banknote handling apparatus 130 is controlled by a controller printed circuit board (PCB) which receives commands issued by the teller via an external terminal or personal computer and operates the apparatus accordingly.

In operation input module 134 may be configured to receive the single instance banking transaction indicia for transport by module 136 past detectors 138. Detectors 138 may be adapted to detect the single instance banking transaction indicia. For example, wherein the transaction indicia includes a barcode, detectors 138 may be configured to include a barcode reader to receive the transaction indicia.

According to an alternative embodiment, apparatus 130 may be configured to include a second set of detectors mounted to detect transaction indicia other than using transport module 136. For example, referring to FIG. 1A, a detector 154 may be positioned such that an account holder approaching apparatus 130 can display the transaction indicia proximate to the detector 154 to allow apparatus 130 to receive the transaction indicia. Displaying the transaction indicia may include positioning a printed piece of paper including the transaction indicia proximate to detector 154, positioning a portable device displaying the transaction indicia proximate to detector 154, etc.

According to yet another alternative embodiment, apparatus 130 may be configured to receive the transaction indicia from an external device including the detector. For example, a "queue walker" within a bank may carry a handheld device including a detector configured to receive the transaction indicia from the account holder, such as by detecting the transaction indicia from a piece of paper, the account holder portable computing device, etc. The handheld device may be configured to communicate the transaction indicia to apparatus 130, such as by a wireless link. The wireless link may further be a wireless link to a computing system 110 configured to control the operation of the apparatus 130.

Apparatus 130 may be configured to communicate with the handheld device to determine when to perform the transaction. For example, apparatus 130 may include a radio frequency transmitter configured to transmit a radio frequency identification tag to the handheld device within a predetermined range of the apparatus 130. Apparatus 130 may be configured to only perform a currency dispensing operation where the handheld device is within six feet of the apparatus 130.

Figure 3:
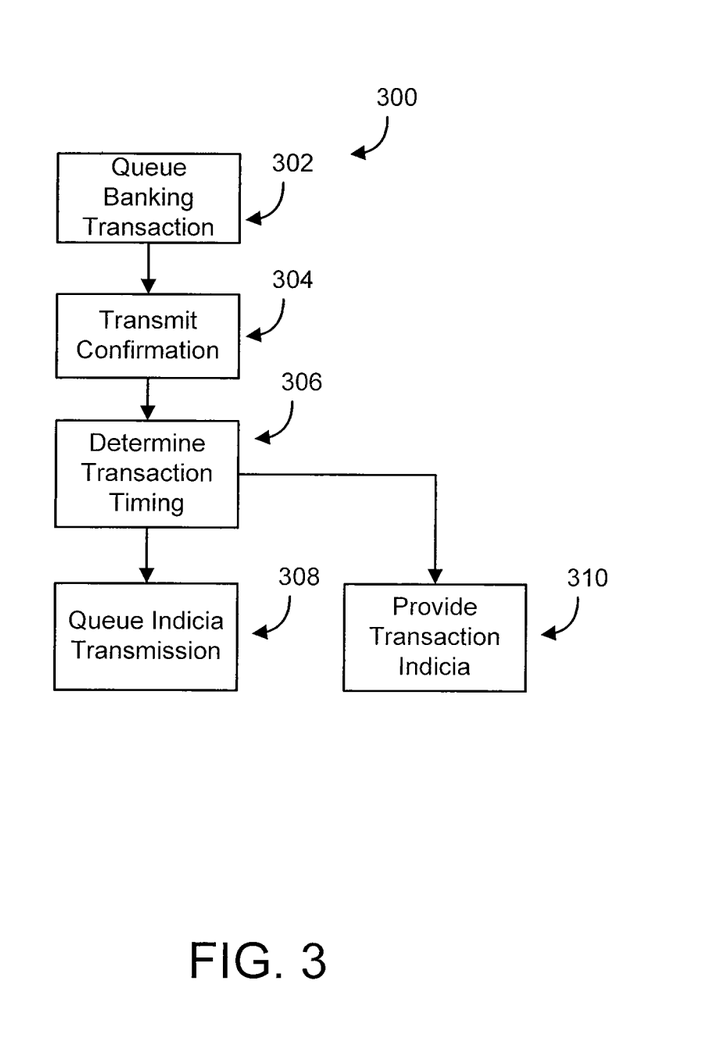
FIG. 3 is a flowchart illustrating a method for facilitating a single instance banking transaction within a banking location, according to an exemplary embodiment.

Referring now to FIG. 3, a flowchart 300 illustrating a method for facilitating a single instance banking transaction within a banking location is shown, according to an exemplary embodiment. The steps of flowchart 300 may be performed, for example, where an account holder is working with a mortgage banker and requests that the banker perform a withdrawal transaction from their account. The steps of flowchart 300 may be performed by one or more of systems 110 and 120, described above with reference to FIGS. 1 and 2. Flowchart 300 lists steps that may be performed in an exemplary transaction with an account holder.

In a step 302, a personal banker uses a system 120 to queue a banking transaction. Queuing a transaction may include transmitting a transaction request to central banking system 110 for queuing in system 110. The transaction request may include all of the information needed to perform the transaction such as an account number, a transaction type, a transaction amount, a security code, etc. In a step 304, system 120 generates a transaction confirmation that is communicated to the account holder, for example through a text message, an email message, a printed receipt, etc.

In a step 306, a determination is made whether the transaction can be performed immediately. The transaction may not be able to be performed for any number of reasons such as an amount being requested by an account holder that requires additional confirmation, the location of the account holder and/or system 120 relative to a transaction system 130, a desired timing provided by the account holder, etc. If the transaction can not be performed immediately, system 120 may be configured to queue transmission of a transaction indicia in a step 308 for subsequent processing as discussed in further detail below with reference to FIG. 5.

If the transaction is to be performed immediately, a transaction indicia may be provided to the user in a step 310. The transaction indicia may be provided, for example, as a barcode on a printed piece of paper, embedded in an electronic message transmitted to a portable electronic device indicated by the account holder that may be configured for displaying the transaction indicia, etc. The transaction indicia may be generated to include all of the details of the transaction in a secure format as described above with reference to FIG. 1. The transaction indicia may be utilized in a transaction indicia processing operation as described below with reference to FIG. 5.

Figure 4:
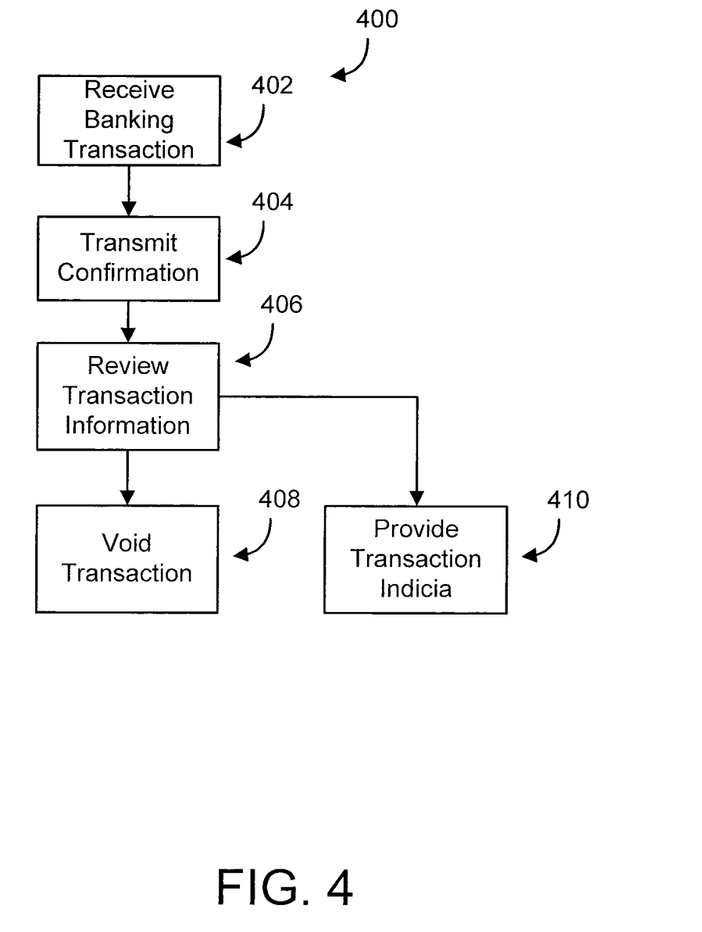
FIG. 4 is a flowchart illustrating a method for facilitating a single instance banking transaction from a remote location, according to an exemplary embodiment.

Referring now to FIG. 4, a flowchart 400 illustrating a method for facilitating a single instance banking transaction from a remote location is shown, according to an exemplary embodiment. The steps of flowchart 400 may be performed, for example, where an account holder is working on a computer system in their home or office. The steps of flowchart 400 may be performed by one or more of systems 110 and 120, described above with reference to FIGS. 1 and 2. Flowchart 400 also lists steps that may be performed in an exemplary transaction with an account holder.

In a step 402, an account holder uses a system 120 to initiate a banking transaction, such as a currency withdrawal. Initiating the transaction includes providing the transaction details, such as an account number, a transaction amount, a desired collection date, a desired collection location, a security code, etc. In a step 404, system 120 generates a transaction confirmation that is communicated to the account holder, for example through a text message, an email message, a printed receipt, etc.

In a step 406, a determination may be made by systems 110 and/or 120 whether the received transaction request is of a type requiring additional information. Exemplary types requiring additional information can include high value transactions, suspicious transactions, etc. If the transaction requires additional confirmation, communication with the account holder, either electronically or in person, may be initiated. If the confirmation fails, the transaction may be voided in a step 408.

If the confirmation is successful and/or the transaction request is not a type that requires confirmation, system 120 may be configured to queue transmission of a transaction indicia for subsequent processing in a step 410.

Queuing a transmission of a transaction indicia for subsequent processing may include configuring an electronic messaging system to communicate the transaction indicia to the account holder based on the occurrence of a triggering event. The triggering event may be a specific time when the account holder is planning to visit a location having a teller machine 130, may be based an action by the account holder, such as sending a message to system 110 and/or system 120 indicating a desire to perform the transaction, etc. The triggering event and/or the indicia may further be configured to have an associated time window or a timeout value.

Figure 5:
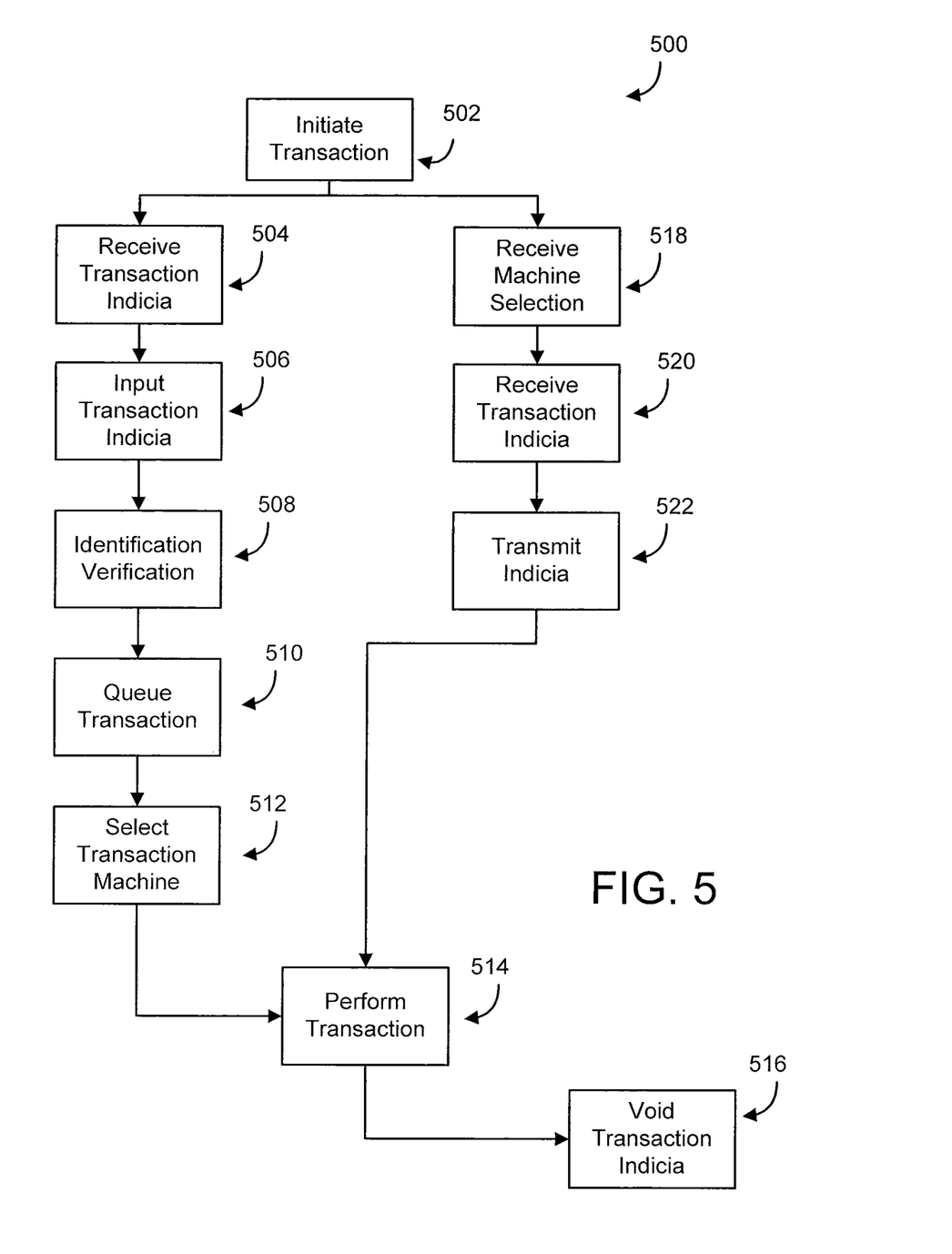
FIG. 5 is a flowchart illustrating a method for performing a single instance banking transaction, according to an exemplary embodiment.

Referring now to FIG. 5, a flowchart 500 illustrating a method for performing a single instance banking transaction is shown, according to an exemplary embodiment. The steps of flowchart 500 may be performed, for example, where an account holder has arrived at a banking location to perform the transaction. The steps of flowchart 500 may be performed by one or more of systems 110-130.

In a step 502, an account holder arrives at a location having an automated transaction machine 130 to perform a previously generated single instance banking transaction. The account holder is in possession of a transaction indicia that may include all of the information that is required to perform the transaction. The transaction indicia may be a bar code value, a string of coded numbers, and/or any other encoded transaction information. The transaction indicia may be carried by the account holder in printed form, such as on a printed receipt, or electronically, such as for display on a display screen of a portable electronic device.

In a first instance, performing the transaction may be facilitated by a bank employee, such as a queue walker. In a step 504, the account holder can provide the transaction indicia to the queue walker for scanning using a handheld device in a step 506. The handheld device may be any type of device configured to be able to read, store and transmit the transaction indicia.

In a step 508, the bank employee may perform an identification verification for the account holder. Identification verification may include, for example, confirming that a picture of the account holder displayed on the handheld device based on the transaction indicia matches the person that presented the transaction indicia, receiving a radio frequency signal at the handheld device from a bank card held by the account holder, etc.

In a step 510, the transaction indicia may be used to queue the transaction for performance. Queuing the transaction may include decrypting the transaction indicia, validating the transaction information, commanding a teller machine 130 to perform the transaction, etc. In a step 512, the bank employee can direct the account holder to a teller machine 130 that will perform the transaction.

In a step 514, the handheld device is configured to communicate with the teller machine 130 to command the machine to perform the transaction. In one exemplary embodiment, the bank employee may manually select a specific machine, scan a machine barcode/ID tag, receive a radio frequency ID, etc. associated with a particular teller machine 130 using the handheld device. This tag may be transmitted by the handheld device to system 110 to initiate a command to the teller machine 130 to perform the transaction.

In a step 516, following performance of the transaction, system 110 may be configured to void the transaction indicia. System 110 may further be configured to record the occurrence of the transaction in the account records for the account holder.

According to an alternative embodiment, the transaction may be performed by the account holder without the assistance of a bank employee. In a step 518, the account holder initiates that transaction using an interface on a teller machine 130. In a step 520, the account holder presents the transaction indicia to the machine 130. Presenting the transaction may include feeding a sheet of paper bearing the transaction indicia into an input module, holding the transaction viewer displayed on paper or an electronic device in front of a reader built into the machine 130, and/or otherwise communicating the transaction indicia to the machine 130.

In a step 520, machine 130 is configured to perform an identification verification of the account holder. Identification may include requesting a security code, using a camera to compare a received image to a stored image, requesting a biometric input, such as by using a fingerprint reader, etc.

In a step 522, machine 130 may communicate the transaction indicia to system 110. The transaction indicia may be used to queue the transaction for performance. Queuing the transaction may include decrypting the transaction indicia, validating the transaction information, commanding the teller machine 130 to perform the transaction in step 514, etc. Following performance of the transaction, the transaction may be voided in step 516 as described above.

Although a particular series of steps are shown and described in a particular order in the flowcharts shown in FIGS. 3 and 4 and described above, it should be understood that the methods described with reference to these flowchart may be implemented using more, fewer, and/or a different ordering of the steps to perform the functions described therein. Further, although the description describes specific steps being performed by specific systems, one of ordinary skill in the art would recognize that the steps may be performed in a variety of ways using a variety of different systems to achieve the benefits described herein.

Various alternatives are contemplated as being within the scope of the following claims particularly pointing out and distinctly claiming the subject matter regarded as the invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

I claim:

1. A computer implemented method performed by at least one banking computer system based on instructions embodied on at least one computer readable medium for facilitating a single instance banking transaction, comprising receiving a banking transaction request from a banking account, holder at a first banking computer system, the request including at least an account identification and transaction information detailing at least one banking transaction to be performed;

queuing the at least one banking transaction to be performed in a transaction queue without performing the at least one banking transaction described by the transaction request;

generating a single instance banking transaction indicia;

associating the single instance banking indicia with each of the at least one transaction within the transaction queue that are correlated to the banking transaction request;

providing the single instance banking transaction indicia to the banking account holder;

receiving the single instance banking transaction indicia at a second banking computer system; and performing each of the at least one banking transactions in the transaction queue that are associated with the single instance banking indicia based on the receipt of the single instance banking transaction indicia using hardware of the second banking computer system.

2. The method of claim 1, wherein performing the banking transaction request at the second banking computer system includes voiding the single instance banking transaction indicia.

3. The method of claim 1, wherein the single banking transaction indicia is a bar code.

4. The method of claim 3, wherein providing the single instance banking transaction indicia to the banking account holder includes providing a paper slip including the bar code.

5. The method of claim 4, wherein receiving the single instance banking transaction indicia at a second banking computer system includes scanning the bar code at the second banking computer system.

6. The method of claim 1, wherein receiving the single instance banking transaction indicia at a second banking computer system includes receiving the transaction indicia using a portable scanning device.

7. The method of claim 6, wherein the portable scanning device is configured to communicate wirelessly with the second banking computer system to perform the banking transaction.

8. A banking computer system for facilitating a single instance banking transaction, comprising
a first banking computer system configured to
receive a banking transaction request from a banking account holder, the request including at least an account identification and transaction information detailing at least one banking transaction to be performed,
queue the at least one banking transaction to be performed in a transaction queue without performing the at least one banking transaction described by the transaction request,
generate a single instance banking transaction indicia, and
associate the single instance banking indicia with each of the at least one transaction within the transaction queue that are correlated to the banking transaction request,
including an indicia communication device for providing the single instance banking transaction indicia to the banking account holder; and
a second banking computer system for receiving the single instance banking transaction indicia and performing each of the at least one banking transactions in the transaction queue that are associated with the single instance banking indicia based on the receipt of the single instance banking transaction indicia using hardware controlled by the second banking computer system.

9. The system of claim 8, wherein the second banking computer system is configured to void the single instance banking transaction indicia following performance of the banking transaction.

10. The system of claim 8, wherein the single banking transaction indicia is a bar code.

11. The system of claim 8, wherein indicia communication device is a printer configured to provide a paper slip including the transaction indicia.

12. The system of claim 8, wherein indicia communication device is a communication protocol implemented by the first banking computer system to electronically communicate the transaction indicia.

13. The system of claim 8, wherein the second banking computer system includes a visual scanner for scanning the bar code at the second banking computer system.

14. The system of claim 8, further including a portable handheld scanning device.

15. The system of claim 14, wherein the portable handheld scanning device is configured to communicate wirelessly with the second banking computer system to initiate performance of the banking transaction.

16. A banking computer system for facilitating a single instance banking transaction, comprising
a first banking computer system configured to receive a banking transaction request from a banking account holder, the request including at least an account identification and transaction information detailing at least one banking transaction to be performed and generate a single instance banking transaction indicia correlated to the banking transaction request without performing the banking transaction described by the transaction request, the first banking computer system including a indicia communication device for providing the single instance banking transaction indicia to the banking account holder;
a central banking computer system configured to queue the at least one banking transaction to be performed in a transaction queue without performing the at least one banking transaction described by the transaction request and associate the single instance banking indicia with each of the at least one transaction within the transaction queue that are correlated to the banking transaction request, the central banking computer system including a database including banking accounts for a plurality of account holders;
a handheld scanning device configured to receive the transaction indicia in a scanning operation and, to communicate the transaction request to the central banking computer system;
an automated transaction machine configured to perform each of the at least one banking transactions in the transaction queue that are associated with the single instance banking indicia based on the receipt of the transaction indicia from the handheld scanning device.

17. The system of claim 16, central banking system is configured to void the single instance banking transaction indicia following performance of the banking transaction.

18. The system of claim 16, wherein the single banking transaction indicia is a bar code.

19. The system of claim 16, wherein the handheld scanning device is configured to receive a radio frequency signal from the automated transaction machine to identify the automated transaction machine to perform the transaction.

20. The system of claim 16, wherein the handheld scanning device is configured to also receive an identification code associated with an automated transaction machine and the communication of the transaction request includes the automated transaction machine identification code.

21. A computer program including computer-executable instructions on a computer-readable medium, the instruction operative to cause at least one computer to implement a plurality of steps, comprising:
receiving a banking transaction request from a banking account holder at a first banking computer system, the request including at least an account identification and transaction information detailing at least one banking transaction to be performed;
queuing the at least one banking transaction to be performed in a transaction queue without performing the at least one banking transaction described by the transaction request;
generating a single instance banking transaction indicia;

associating the single instance banking indicia with each of the at least one transaction within the transaction queue that are correlated to the banking transaction request;

providing the single instance banking transaction indicia to the banking account holder;

receiving the single instance banking transaction indicia at a second banking computer system; and performing each of the at least one banking transactions in the transaction queue that are associated with the single instance banking indicia based on the receipt of the single instance banking transaction indicia using hardware of the second banking computer system.

\* \* \* \* \*